US012811485B2

(12) United States Patent
Lee et al.

(10) Patent No.: US 12,811,485 B2
(45) Date of Patent: Nov. 24, 2026

(54) POWER CONTROL SYSTEM TO MANAGE POWER OF POWER SUPPLY DEVICE BY DIVIDING IT INTO STANDBY MODE AND NORMAL MODE

(71) Applicant: POWER LSI CO., LTD., Daejeon (KR)

(72) Inventors: Won Tae Lee, Bucheon-si (KR); Won Ji Lee, Daejeon (KR); Chun Sik Chung, Suwon-si (KR); Gyu Won Lee, Guri-si (KR); Jung Tae Lee, Seongnam-si (KR)

(73) Assignee: POWER LSI CO., LTD., Daejeon (KR)

( * ) Notice: Subject to any disclaimer, the term of this patent is extended or adjusted under 35 U.S.C. 154(b) by 131 days.

(21) Appl. No.: 18/942,791

(22) Filed: Nov. 11, 2024

(65) Prior Publication Data

US 2025/0309748 A1 Oct. 2, 2025

(30) Foreign Application Priority Data

Mar. 27, 2024 (KR) ........................ 10-2024-0042093

(51) Int. Cl.
*H02M 1/00* (2007.01)
*H02M 1/08* (2006.01)
*H02M 7/219* (2006.01)

(52) U.S. Cl.
CPC ........... *H02M 1/0032* (2021.05); *H02M 1/08* (2013.01); *H02M 7/219* (2013.01)

(58) Field of Classification Search
CPC ............. H02M 1/0003; H02M 1/0006; H02M 1/0025; H02M 1/0032; H02M 1/0035; H02M 1/0041; H02M 1/0096; H02M 1/08; H02M 1/0092; H02M 1/36; H02M 1/4258; H02M 3/335; H02M 3/33507; H02M 3/33523; H02M 3/3353; H02M 3/33538; H02M 3/33553; H02M 3/337; H02M 7/219; H02J 9/00; H02J 9/005; H02J 9/007;

(Continued)

(56) References Cited

U.S. PATENT DOCUMENTS 6,107,698 A * 8/2000 Ochiai ..................... H04N 5/63
307/64
7,598,631 B2 * 10/2009 Szabados ............... H01H 47/22
307/140

FOREIGN PATENT DOCUMENTS

KR 20010083638 A 9/2001
KR 101190684 B1 10/2012

(Continued)

OTHER PUBLICATIONS

Korean patent office action for Application No. 10-2024-0042093 Issued on May 27, 2024.

*Primary Examiner* — Thienvu V Tran
*Assistant Examiner* — Carlos O Rivera-Perez
(74) *Attorney, Agent, or Firm* — Revolution IP, PLLC

(57) ABSTRACT

Disclosed are a standby power reducing device and a method for reducing standby power by physically cutting off an AC power of an electronic device. According to an exemplary embodiment, a standby power reducing device which cuts off an AC power to be supplied to an external device includes a switch driver which controls a switch connected to an AC power to be supplied to the external device; and a controller which receives a control signal to control a switch driver.

17 Claims, 9 Drawing Sheets

(58) Field of Classification Search
CPC ...... H02J 9/04; H02J 9/06; H02J 9/062; H02J 9/067; H02J 9/068
USPC ......... 363/15–21.3, 34, 37, 40–48, 106–109, 363/123–127, 131; 323/266, 269–275, 323/282–289, 311–317, 351; 361/18, 361/71–75, 100–102, 114, 115, 160, 361/170–177
See application file for complete search history.

(56) References Cited

FOREIGN PATENT DOCUMENTS

| | | | |
|---|---|---|---|
| KR | 101530598 | B1 | 6/2015 |
| KR | 20150127364 | A | 11/2015 |

* cited by examiner

POWER CONTROL SYSTEM TO MANAGE POWER OF POWER SUPPLY DEVICE BY DIVIDING IT INTO STANDBY MODE AND NORMAL MODE

CROSS-REFERENCE TO RELATED APPLICATIONS

This application claims the priority of Korean Patent Application No. 10-2024-0042093 filed on Mar. 27, 2024, in the Korean Intellectual Property Office, the disclosure of which is incorporated herein by reference.

BACKGROUND

Field

The present disclosure relates to a technique for reducing standby power, and more particularly, to a standby power reducing device and a method thereof to reduce a standby power by physically cutting off an AC power of an electronic device.

Description of the Related Art

Standby power refers to power consumed even when an electronic device is not being used, but a plug thereof is simply put into an outlet. The standby power of the electronic device is mainly caused because a power device which supplies power to the electronic device performs the same function as in an operating state. Accordingly, in order to reduce standby power, the power itself which is supplied to the electronic device needs to be cut off. However, when the power of the electronic device is cut off, the electronic device cannot perform any other operations so that the electronic device cannot receive the request of the user to operate the electronic device. Accordingly, a study for a method for cutting off the power when the electronic device is not used, but reconnecting the power according to the user's request to operate the electronic device is necessary.

Korean Registered Patent No. 10-1190684 discloses a system and a method for reducing standby power consumption.

SUMMARY

An object is to provide a standby power reducing device and a method thereof for reducing a standby power by physically cutting off AC power of an electronic device.

According to an aspect, a standby power reducing device which cuts off an AC power to be supplied to an external device includes a switch driver which controls a switch connected to an AC power to be supplied to the external device; and a controller which receives a control signal to control the switch driver.

The switch connected to the AC power of the external device is a latching relay.

The controller sets or resets the latching relay through the switch driver based on the control signal.

The switch driver includes a bridge rectifier which receives and rectifies the AC power and controls a gate of a metal oxide semiconductor field effect transistor MOSFET connected to an output of the bridge rectifier to generate a signal for setting or resetting the latching relay.

The standby power reducing device further includes: a pulse generator which generates one or more pulses to control the output of a transformer.

The transformer supplies DC power to a power controller included in a secondary side of the external device.

The power controller is connected to the controller and the controller controls the switch driver based on a control signal received from a power controller of the external device.

When the power controller receives a signal to turn on the power source of the external device, the power controller transmits a control signal to the controller for switch connection and when the power controller receives a signal to turn off the power source of the external device, transmits a control signal to cut off the switch.

The standby power reducing device further includes a power supply which receives an AC power to supply a DC current to the switch driver, the controller, and the pulse generator.

According to an aspect, a standby power reducing method which cuts off an AC power to be supplied to an external device includes a step of receiving a control signal to generate a switch driving signal; and a step of controlling a switch connected to an AC power to be supplied to an external device based on a switch driving signal.

According to an aspect, a standby power reducing system includes an external device which receives an AC power to operate; and a standby power reducing device which cuts off an AC power to be supplied to an external device, the standby power reducing device includes a switch driver which controls a switch connected to an AC power to be supplied to the external device; and a controller which receives a control signal to control a switch driver.

In a standby mode in which the electronic device does not operate, the standby power is reduced by cutting off the power of the electronic device. Further, when there is a user's request for the use of the electronic device, the power of the electronic device is turned on to operate the electronic device without a separate control operation.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF EXEMPLARY EMBODIMENTS

Hereinafter, an exemplary embodiment of the present disclosure will be described in detail with reference to the accompanying drawings. In the description of the present disclosure, a detailed description of known configurations or functions incorporated herein will be omitted when it is determined that the detailed description may make the subject matter of the present disclosure unclear. Further, the terms to be described below are defined considering the functions in the present disclosure and may vary depending on the intention or usual practice of a user or operator. Accordingly, the terms need to be defined based on details throughout this specification.

Hereinafter, exemplary embodiments of a standby power reducing device, and a method thereof will be described in detail with reference to drawings.

Figure 1:
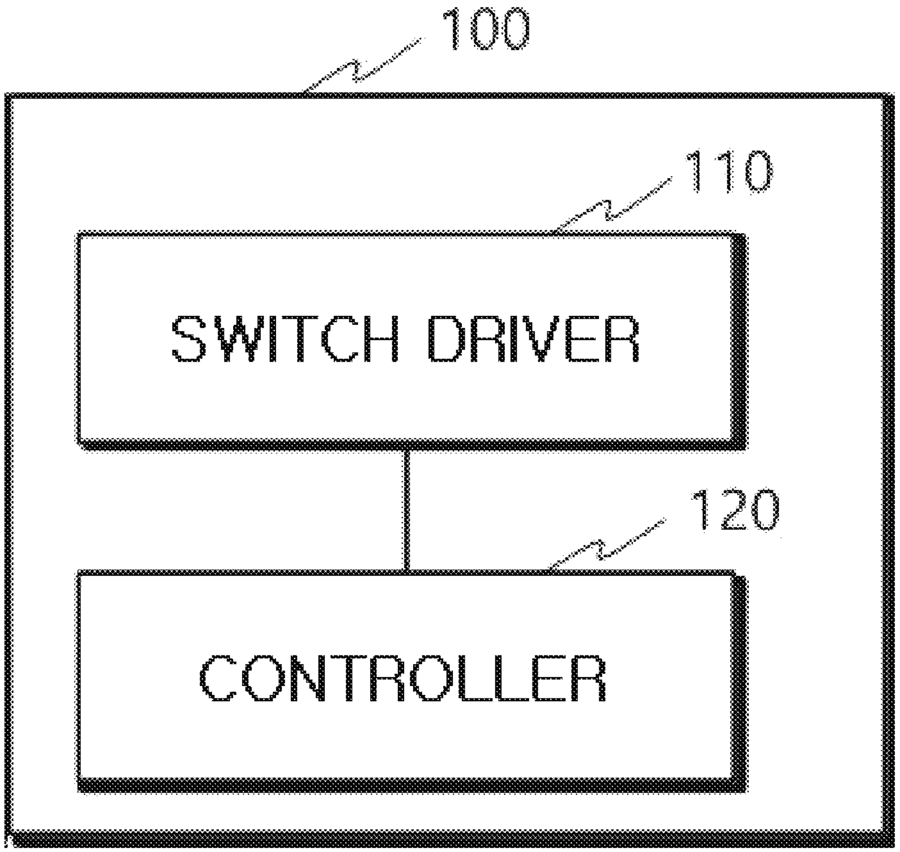
FIG. 1 is a diagram of a standby power reducing device according to an exemplary embodiment.

FIG. 1 is a diagram of a standby power reducing device according to an exemplary embodiment.

According to an exemplary embodiment, a standby power reducing device 100 includes a switch driver 110 which controls a switch connected to an AC power to be supplied to an external device and a controller 120 which receives a control signal to control the switch driver 110.

Figure 2:
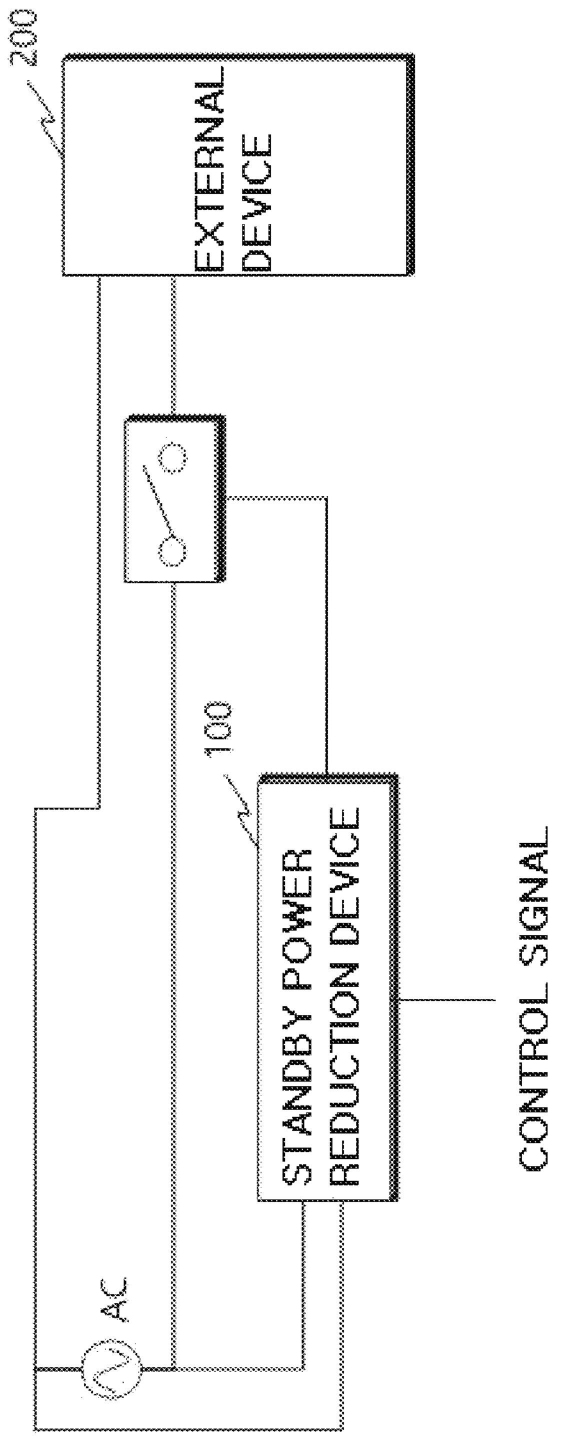
FIG. 2 is an exemplary diagram for explaining an operation environment of a standby power reducing device according to an exemplary embodiment.

For example, the standby power reducing device 100 physically cuts off the AC power which is input to the external device to remove the standby power. Referring to FIG. 2, a switch may be provided in the AC power supply which is input to the external device 200 and the standby power reducing device 100 cuts off the AC power based on the control signal to cut off the standby power generated in the external device 200. For example, the external device may be an electronic device, such as a TV, a PC, or an air conditioner.

According to the exemplary embodiment, the switch connected to the AC power of the external device 200 may be a latching relay. In this case, the controller 120 sets or resets the latching relay by means of the switch driver 110 based on the control signal.

According to one example, the control signal is connected to a physical switch to allow a user to turn on/off the switch to generate the control signal. As another example, the control signal is generated by the external signal which is received through a wireless communication module or a sensor. For example, the wireless communication module or the sensor is provided in the standby power reducing device 100 and senses a signal which turns on/off the external device 200 to generate a control signal of the standby power reducing device 100.

According to one example, the control signal is a signal which is generated in the external device 200. For example, the external device 200 generates a control signal according to its own on/off state to transmit the control signal to the standby power reducing device 100. A specific exemplary embodiment thereof will be described in more detail with reference to FIG. 3.

Figure 3:
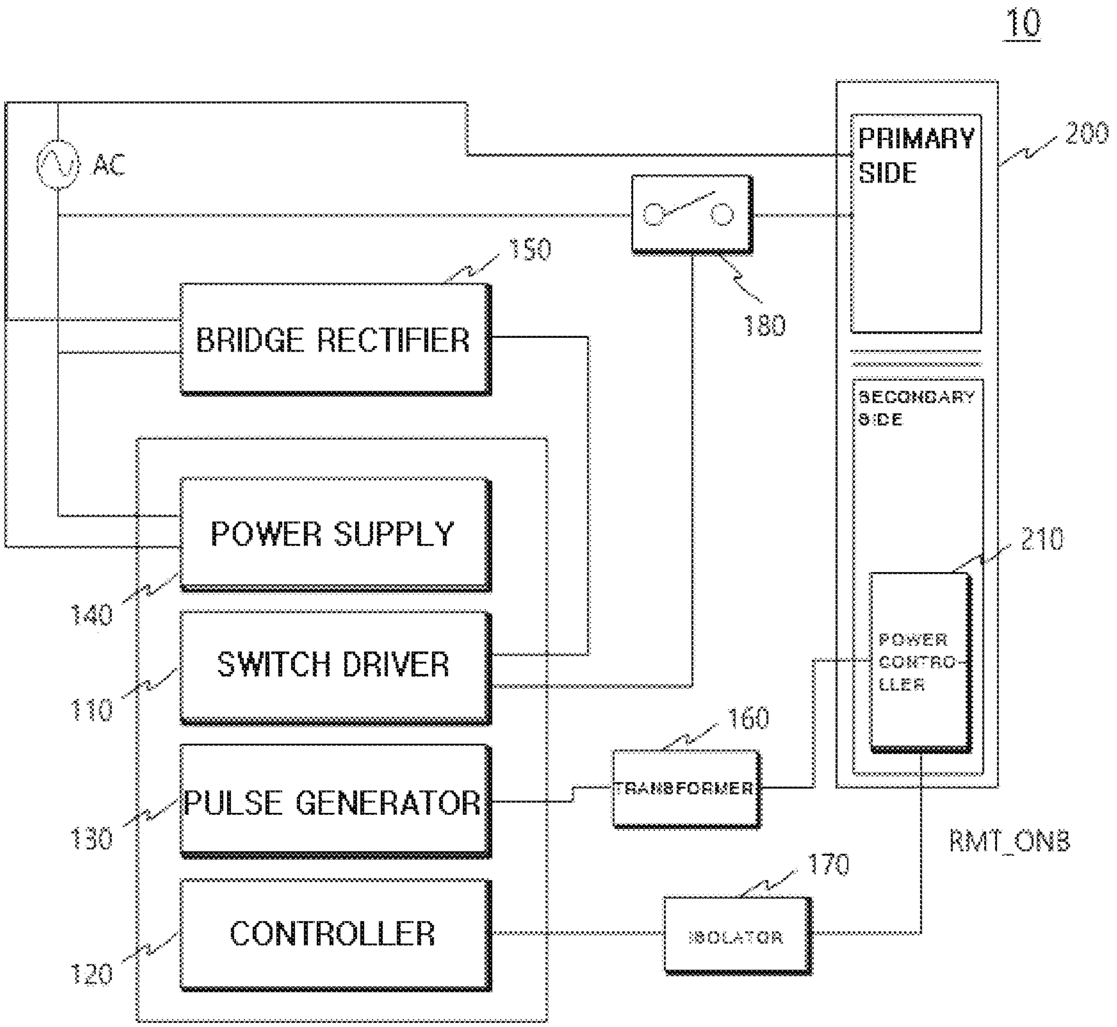
FIG. 3 is a diagram of a standby power reducing device and system according to an exemplary embodiment.

FIG. 3 is an exemplary view for explaining an additional configuration of a standby power reducing device according to an exemplary embodiment.

According to the exemplary embodiment, the switch driver 110 includes a bridge rectifier 150 which receives and rectifies the AC power and controls a gate of a metal oxide semiconductor field effect transistor MOSFET connected to an output of the bridge rectifier 150 to generate a signal for setting or resetting the latching relay. For example, the MOSFET may be an NMOS.

For example, the switch driver 110 is driven with the power supplied from the power supply 140 and generates a signal for controlling the switch 180 under the control of the controller 120. Separately, a signal for driving the switch 180 may use a signal generated through the bridge rectifier 150 which is directly connected to the AC power supply.

Figure 4:
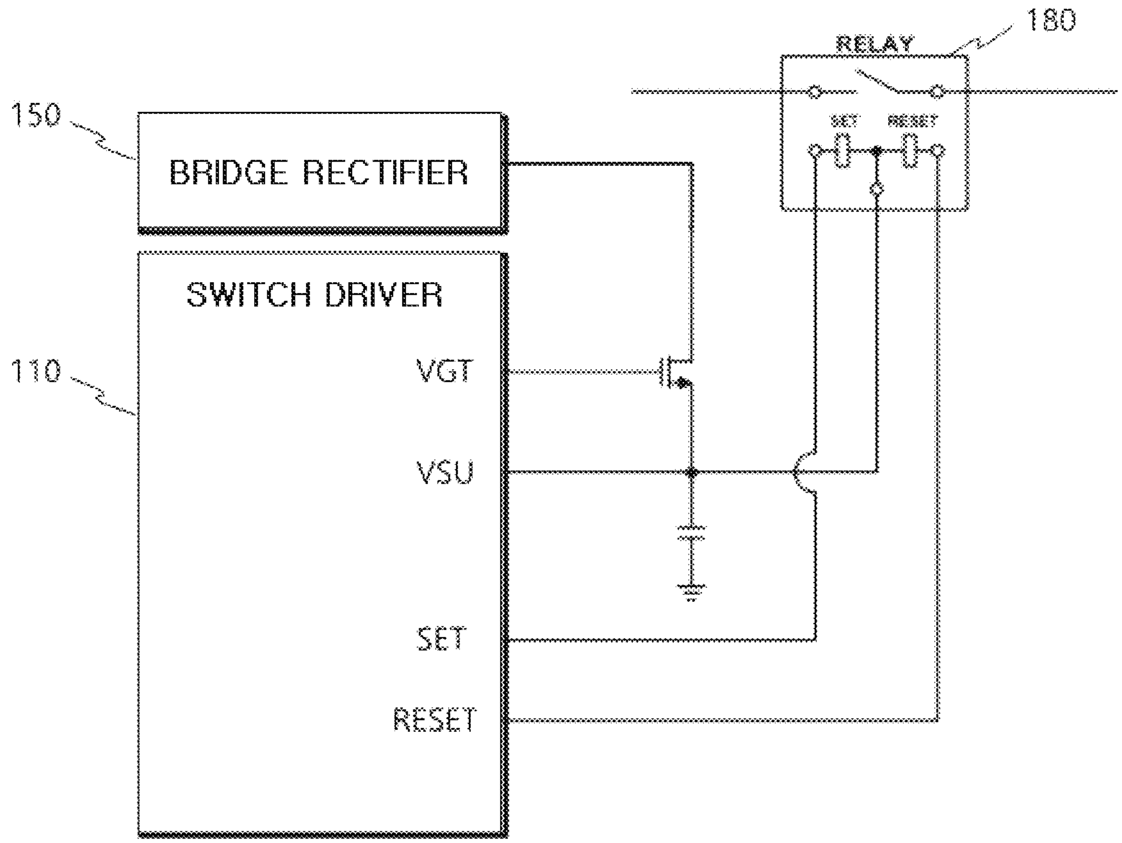
FIGS. 4, 5, 6, and 7 are exemplary views for explaining an operation of a switch driver according to an example.
Figure 5:
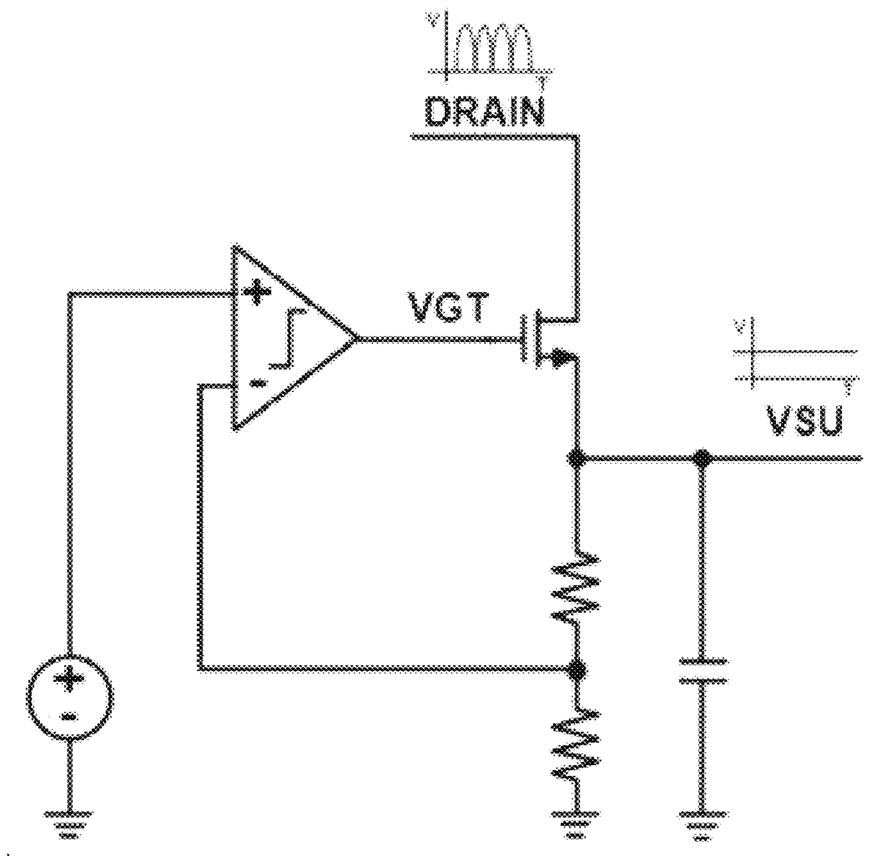

Referring to FIG. 4, the bridge rectifier 150 receives the AC power to generate a rectified signal and the switch driver 110 generates a signal VGT which controls the gate of the MOSFET connected to an output of the bridge rectifier 150. For example, the switch driver 110 controls the gate of the MOSFET using the signal VGT, as illustrated in FIG. 5, and an output signal of the MOSFET is connected to the VSU.

Figure 6:
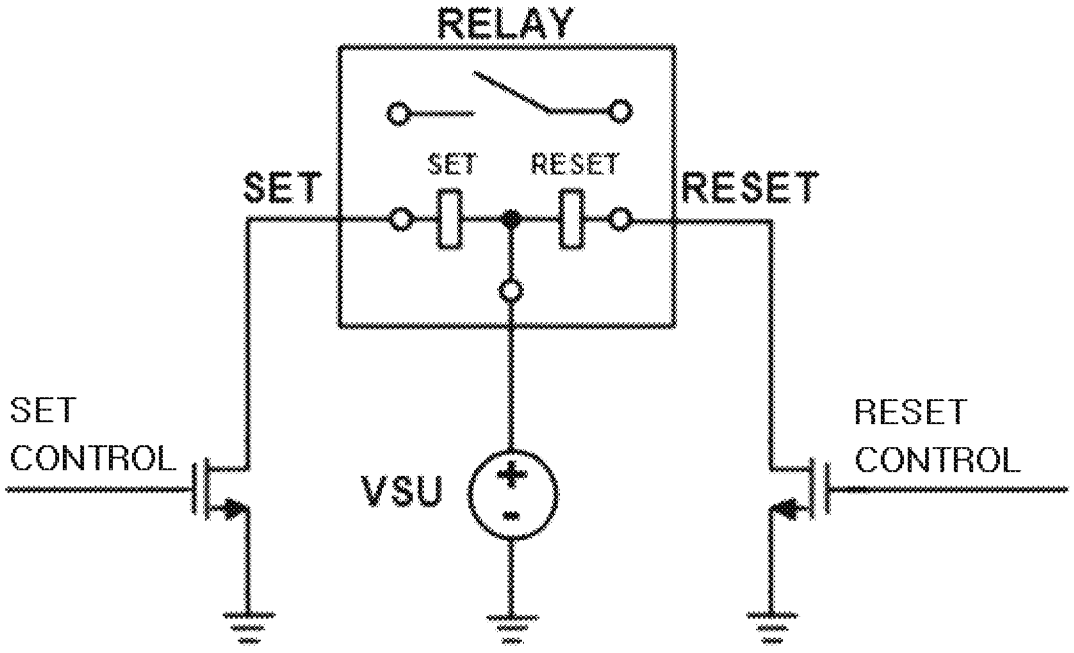

Referring to FIG. 4, the switch driver 110 supplies the VSU as a driving power of the switch 180 and controls the switch 180 through a signal for setting or resetting the switch 180. For example, as illustrated in FIG. 6, the switch driver 110 controls the gate of the MOSFET for generating a set signal and a reset signal.

According to the exemplary embodiment, the standby power reducing device 100 further includes a power supply 140 which receives the AC power to supply a DC current to the switch driver, the controller, and the pulse generator. By doing this, the standby power reducing device 100 may operate regardless of the operation of the external device 200.

According to an exemplary embodiment, the standby power reducing device 100 further includes a pulse generator 130 which generates one or more pulses to control an output of a transformer. Referring to FIG. 3, the pulse generator 130 may be connected to the transformer 160. At this time, the pulse generator 130 is connected to the transformer 160 by means of one or more circuit lines. In other words, the pulse generator 130 transmits one or more pulse signals to the transformer 160 by means of one or more circuit lines.

Figure 8:
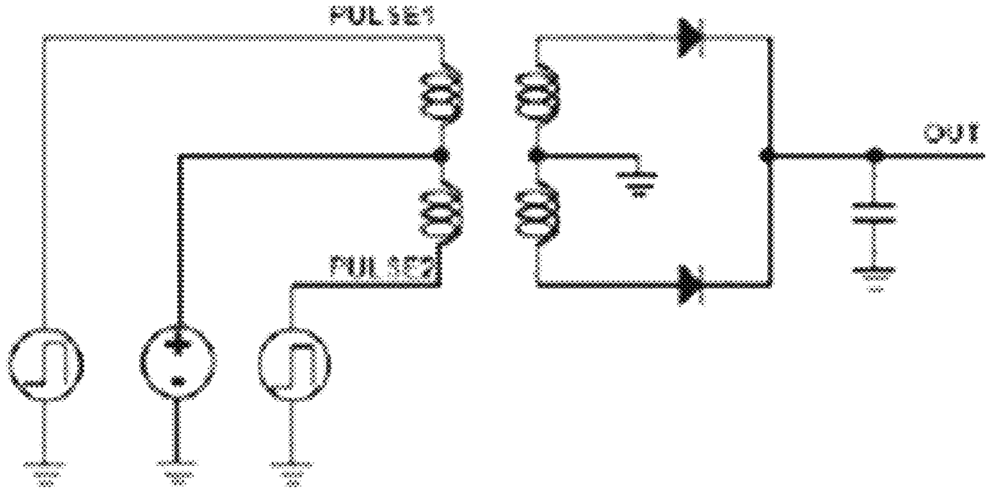
FIG. 8 is an exemplary view for explaining an operation of a pulse generator according to an example.

For example, as illustrated in FIG. 8, the pulse generator 130 is connected to the transformer 160 with two circuit lines to transmit a pulse signal. By doing this, the pulse generator 130 controls an output power of the transformer 160. For example, pulses transmitted through two circuit lines have a BAR relationship so that when one pulse is high, the other pulse is low. That is, two pulses intersect each other to transmit energy from the primary side to the secondary side. For example, the pulse generator 130 adjusts the number of pulses transmitted to two circuit lines to adjust the energy. For example, the pulse generator 130 increases the number of pulses transmitted to two circuit lines to increase the energy.

According to one exemplary embodiment, the transformer 160 supplies a DC power to the power controller 210 included in the secondary side of the external device 200. For example, when the switch 180 is turned off, the external device 200 cannot be supplied with any power. However, in order to control the external device 200 to be on/off by receiving a signal of a user, the signal needs to be received even in an off state of the external device 200. To this end, the power controller 210 needs to be supplied with the power through the transformer 160 at the outside, rather than a power supply provided to drive the external device 200.

For example, the power supply provided in the external device 200 is provided to drive the entire external device 200 and generates a relatively high power. Accordingly, when the provided power supply is used to drive one small internal component, a lot of standby power is generated. In contrast, when a separate transformer 160 for some configurations of the external device 200 is used, just a small quantity of power needs to be generated so that a very small amount of power is consumed. That is, the standby power of the external device 200 can be efficiently reduced.

According to an example, the power controller 210 is supplied with the power from the transformer 160 in an OFF state of the external device 200. Further, the power controller 210 may be supplied with the power from at least one of the power controller 210 and a power supply of the external device 200 in the ON state of the external device 200.

According to the exemplary embodiment, the power controller 210 is connected to the controller 120. At this time, the controller 120 controls a switch driver based on the control signal received from the power controller 210 of the external device 200. For example, when the power controller 210 receives a signal to turn on the power source of the external device, the power controller transmits a controls signal to the controller to turn on the switch and when the power controller receives a signal to turn off the power source of the external device, transmits a control signal to the controller to turn off the switch.

Figure 7:
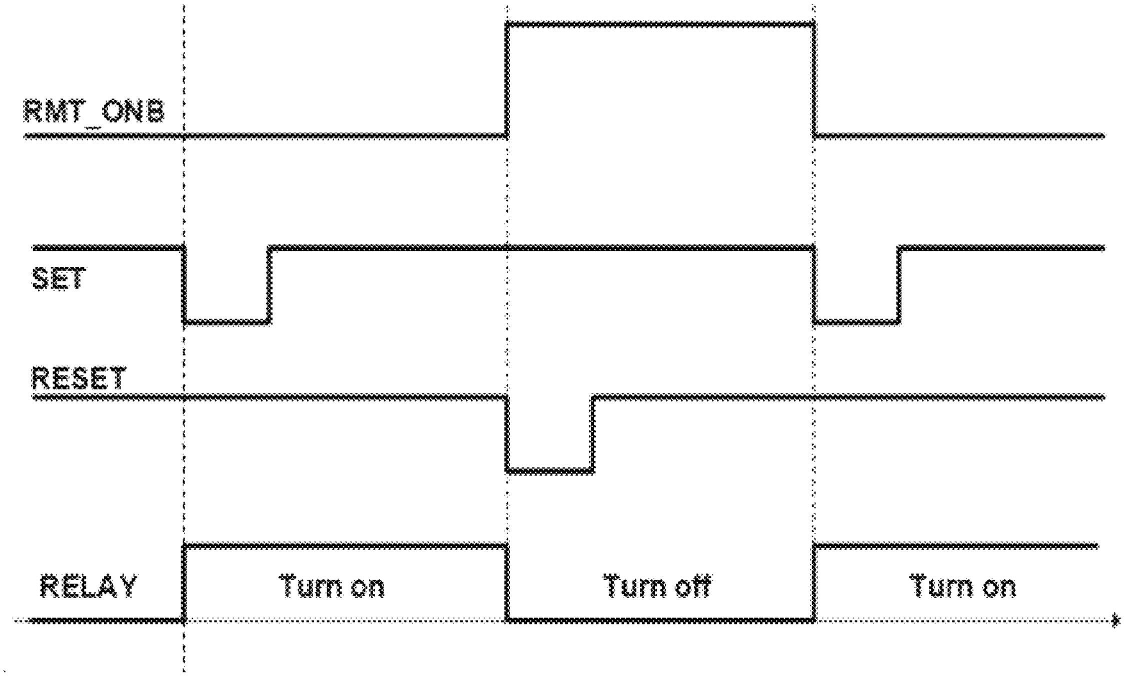

Referring to FIG. 7, the power controller 210 generates a control signal RMT_ONB. For example, when the control signal RMT_ONB is high, the controller 120 receives the control signal to control a RESET signal of the switch driver 110 and thus turn off the switch 180. In contrast, when the control signal RMT_ONB is low, the controller 120 controls the SET signal of the switch driver 110 to turn on the switch 180.

FIG. 3 is a diagram of a standby power reducing device and system according to an exemplary embodiment.

According to an exemplary embodiment, the standby power reducing device and system 10 includes an external device 200 which receives an AC power to operate and a standby power reducing device 100 which cuts off the AC power supplied to the external device.

According to an exemplary embodiment, the standby power reducing device 100 includes a switch driver 110 which controls a switch connected to an AC power supplied to an external device and a controller 120 which receives a control signal to control the switch driver.

For example, the switch driver 110 includes a bridge rectifier 150 which receives and rectifies the AC power and controls a gate of a metal oxide semiconductor field effect transistor MOSFET connected to an output of the bridge rectifier to generate a signal for setting or resetting the latching relay.

For example, the standby power reducing device 100 further includes a pulse generator 130 which generates one or more pulses to control an output of a transformer.

According to an exemplary embodiment, the external device 200 includes a power controller 210 which receives an external device control signal to control a power of the external device and the power controller 210 is included in the secondary side of the external device. For example, the transformer 160 supplies a DC power to the power controller 210 included in the secondary side of the external device.

According to an example, the power controller 210 is connected to the controller 120 and the controller 120 controls the switch driver 110 based on the control signal received from the power controller 210 of the external device. For example, when the power controller 210 receives a signal to turn on the power source of the external device 200, the power controller transmits a controls signal to the controller 120 to turn on the switch and when the power controller receives a signal to turn off the power source of the external device 200, transmits a control signal to the controller 120 to turn off the switch.

According to an example, the standby power reducing device 100 further includes a power supply 140 which receives the AC power to supply a DC current to the switch driver 110, the controller 120, and the pulse generator 130.

Figure 9:
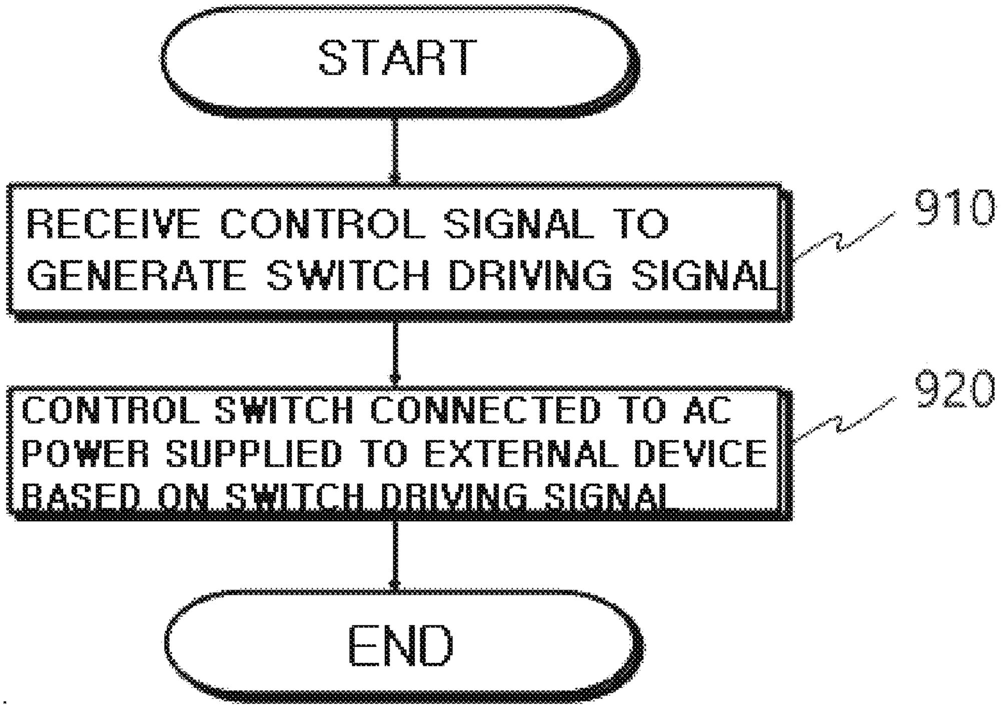
FIG. 9 is a flowchart illustrating a standby power reducing method according to an exemplary embodiment.

FIG. 9 is a flowchart illustrating a standby power reducing method according to an exemplary embodiment.

According to the exemplary embodiment, the standby power reducing device which cuts off the AC power to be supplied to the external device receives the control signal to generate a switch driving signal 910 and controls a switch connected to the AC power to be supplied to the external device based on the switch driving signal 920.

Among the embodiments of FIG. 9, embodiments that overlap the contents described with reference to FIGS. 1 to 8 are omitted.

An aspect of the present disclosure may also be implemented as computer-readable codes written on a computer-readable recording medium. Codes and code segments which implement the program may be easily deducted by a computer programmer in the art. The computer readable recording medium includes all kinds of recording devices in which data, which are capable of being read by a computer system, are stored. Examples of the computer-readable recording media include ROM, RAM, CD-ROM, magnetic tape, floppy disk, optical disk and the like. Further, the computer readable recording medium is distributed in computer systems connected through a network to be written and executed with a computer readable code in a distributed manner.

For now, the present disclosure has been described with reference to the exemplary embodiments. It is understood to those skilled in the art that the present disclosure may be implemented as a modified form without departing from an essential characteristic of the present disclosure. Accordingly, the scope of the present disclosure is not limited to the above-described embodiment, but should be construed to include various embodiments within the scope equivalent to the description of the claims.

What is claimed is:

1. A standby power reducing device which cuts off an AC power to be supplied to an external device, comprising:

a switch driver which controls a switch connected to the AC power to be supplied to the external device; and a controller which receives a control signal to control the switch driver, wherein the switch is a latching relay, the controller sets or resets the latching relay through the switch driver based on the control signal, the switch driver includes a bridge rectifier which receives and rectifies the AC power and controls a gate of a metal oxide semiconductor field effect transistor MOSFET connected to an output of the bridge rectifier to generate a signal to set or reset the latching relay, and the switch driver supplies an output of the MOSFET as a driving power of the latching relay.

2. The standby power reducing device according to claim 1, further comprising: a pulse generator which generates one or more pulses to control an output of a transformer.

3. The standby power reducing device according to claim 2, wherein the transformer supplies DC power to a power controller included in a secondary side of the external device.

4. The standby power reducing device according to claim 3, wherein the power controller is connected to the controller and the controller controls the switch driver based on the control signal received from the power controller of the external device.

5. The standby power reducing device according to claim 4, wherein when the power controller receives a signal to turn on a power source of the external device, the power controller transmits the control signal to the controller to turn on the switch and when the power controller receives a signal to turn off the power source of the external device, transmits the control signal to the controller to turn off the switch.

6. The standby power reducing device according to claim 2, further comprising: a power supply which receives the AC power to supply a DC current to the switch driver, the controller, and the pulse generator.

7. A standby power reducing method for cutting off an AC power to be supplied to an external device, comprising:

a step of receiving a control signal to generate a switch driving signal; and a step of controlling a switch connected to the AC power to be supplied to the external device based on the switch driving signal, wherein the switch is a latching relay, in the step of controlling the switch, the latching relay is set or reset through the switch driving signal generated based on the control signal, in the step of controlling the switch, a gate of a metal oxide semiconductor field effect transistor MOSFET connected to an output of a bridge rectifier which receives and rectifies the AC power is controlled to generate a signal to set or reset the latching relay, and an output of the MOSFET is supplied as a driving power of the latching relay.

8. The standby power reducing method according to claim 7, further comprising: a step of generating one or more pulses to control an output of a transformer.

9. The standby power reducing method according to claim 8, wherein the transformer supplies a DC power to a power controller included in a secondary side of the external device.

10. The standby power reducing method according to claim 9, wherein in the step of generating the switch driving signal, a switch driver is controlled based on the control signal received from the power controller of the external device.

11. The standby power reducing method according to claim 10, wherein when the power controller receives a signal to turn on a power source of the external device, the power controller transmits the control signal to turn on the switch and when the power controller receives a signal to turn off the power source of the external device, transmits the control signal to turn off the switch.

12. A standby power reducing system, comprising:

an external device which receives an AC power to operate; and a standby power reducing device which cuts off the AC power to be supplied to the external device, wherein the standby power reducing device includes: a switch driver which controls a switch connected to the AC power to be supplied to the external device; and a controller which receives a control signal to control the switch driver, wherein the switch is a latching relay, the controller sets or resets the latching relay through the switch driver based on the control signal, the switch driver includes a bridge rectifier which receives and rectifies the AC power and controls a gate of a metal oxide semiconductor field effect transistor MOSFET connected to an output of the bridge rectifier to generate a signal to set or reset the latching relay, and the switch driver supplies an output of the MOSFET as a driving power of the latching relay.

13. The standby power reducing system according to claim 12, wherein the standby power reducing device further includes: a pulse generator which generates one or more pulses to control an output of a transformer.

14. The standby power reducing system according to claim 13, wherein the external device includes a power controller which receives an external device control signal to control a power of the external device, the power controller is included in a secondary side of the external device, and the transformer supplies a DC power to the power controller included in the secondary side of the external device.

15. The standby power reducing system according to claim 14, wherein the power controller is connected to the controller and the controller controls the switch driver based on the control signal received from the power controller of the external device.

16. The standby power reducing system according to claim 15, wherein when the power controller receives a signal to turn on a power source of the external device, the power controller transmits the control signal to the controller to turn on the switch and when the power controller receives a signal to turn off the power source of the external device, transmits the control signal to the controller to turn off the switch.

17. The standby power reducing system according to claim 13, wherein the standby power reducing device further includes: a power supply which receives the AC power to supply a DC current to the switch driver, the controller, and the pulse generator.

* * * * *